United States Patent
Adler et al.

(10) Patent No.: US 8,447,758 B1
(45) Date of Patent: May 21, 2013

(54) SYSTEM AND METHOD FOR IDENTIFYING DOCUMENTS MATCHING A DOCUMENT METAPRINT

(75) Inventors: Dennis R. Adler, Seattle, WA (US); Martin F. Smith, Bainbridge Island, WA (US); Richard J. Corbett, Seattle, WA (US); Kevin J. Harrang, Kirkland, WA (US)

(73) Assignee: Metajure, Inc., Seattle, WA (US)

( * ) Notice: Subject to any disclaimer, the term of this patent is extended or adjusted under 35 U.S.C. 154(b) by 46 days.

(21) Appl. No.: 13/019,959

(22) Filed: Feb. 2, 2011

Related U.S. Application Data

(60) Provisional application No. 61/301,162, filed on Feb. 3, 2010.

(51) Int. Cl.
*G06F 17/30* (2006.01)

(52) U.S. Cl.
USPC .......................................................... 707/722

(58) Field of Classification Search
None
See application file for complete search history.

(56) References Cited

U.S. PATENT DOCUMENTS

2004/0260682 A1* 12/2004 Herley et al. .................... 707/3

* cited by examiner

*Primary Examiner* — Khanh Pham
*Assistant Examiner* — Johnese Johnson
(74) *Attorney, Agent, or Firm* — Patrick J. S. Inouye

(57) ABSTRACT

A system and method for identifying documents matching a document metaprint is provided. A search query comprising one or more search terms is received from a user. One or more metadata keywords matching the one more search terms is identified. A metaprint is retrieved for each of the matching metadata keywords. A metaprint query is generated from the retrieved metadata fingerprints. The metaprint query is executed against a corpus of documents. Search results comprising documents matching the metaprint query are obtained.

16 Claims, 4 Drawing Sheets

SYSTEM AND METHOD FOR IDENTIFYING DOCUMENTS MATCHING A DOCUMENT METAPRINT

CROSS-REFERENCE TO RELATED APPLICATIONS

This non-provisional patent application claims priority under 35 U.S.C. §119(e) to U.S. Provisional Patent application Ser. No. 61/301,162, filed Feb. 3, 2010, the disclosure of which is incorporated by reference.

FIELD

This application relates in general to information retrieval and, in particular, to a system and method for identifying documents matching a document metaprint.

BACKGROUND

Electronic data management, particularly in large enterprise computing environments, is increasingly complicated. For instance, a decreasing cost of electronic storage space in combination with regulatory and legal obligations to retain data has led to exponential growth in data accumulated throughout organizations. Data is often stored in many sites, including local, remote, and centralized databases. Additionally, data is frequently stored on different systems, by different methods, and in multiple formats.

For example, a typical corporate legal department has a large wealth of knowledge contained in stored data, such as documents, databases, and email, which can be leveraged to aid attorneys in preparing new work product. Further, an emphasis on cost-consciousness drives a desire for increased efficiencies in the amount of time spent on legal matters. The volume and dispersed nature of the data makes tracking, searching, and reutilization of such data difficult.

Currently, corporations use different data management tools to address their various needs. For instance, content management, electronic mail, accounting, and deadline tracking are handled by different solutions. Unfortunately, the need for multiple solutions leads to data segregated into many different information silos, each with their own storage formats. Locating and searching content in each silo can require unique user login requirements and individualized search methodologies that return standalone, segregated, and customized search results.

Conventional content management and search tools have proven inadequate for providing efficient detection of related documents. For example, BA-Insight LLC, a Delaware limited liability company, conducts post-processing of search query results of documents. Documents matching a user search query are first identified. The identified documents are then grouped based on shared metadata information, such as author or date, and returned to the user. However, documents that may be relevant to the user's query, but lack the search query terms, are not considered.

Thus, there remains a need for a system and method for increasing the efficiency of document search by identifying content similarity across documents.

SUMMARY

Words and word frequencies contained in a particular type of a document can serve as a "metaprint" of that type of document. Document metaprints allow a user to search for and identify documents of interest that may not precisely match the user's search query.

One embodiment provides a system and method for identifying documents matching a document metaprint. A search query comprising one or more search terms is received from a user. One or more metadata keywords matching the one or more search terms is identified. A metaprint is retrieved for each of the matching metadata keywords. A metaprint query is generated from the retrieved metadata fingerprints. The metaprint query is executed against a corpus of documents. Search results comprising documents matching the metaprint query are obtained.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
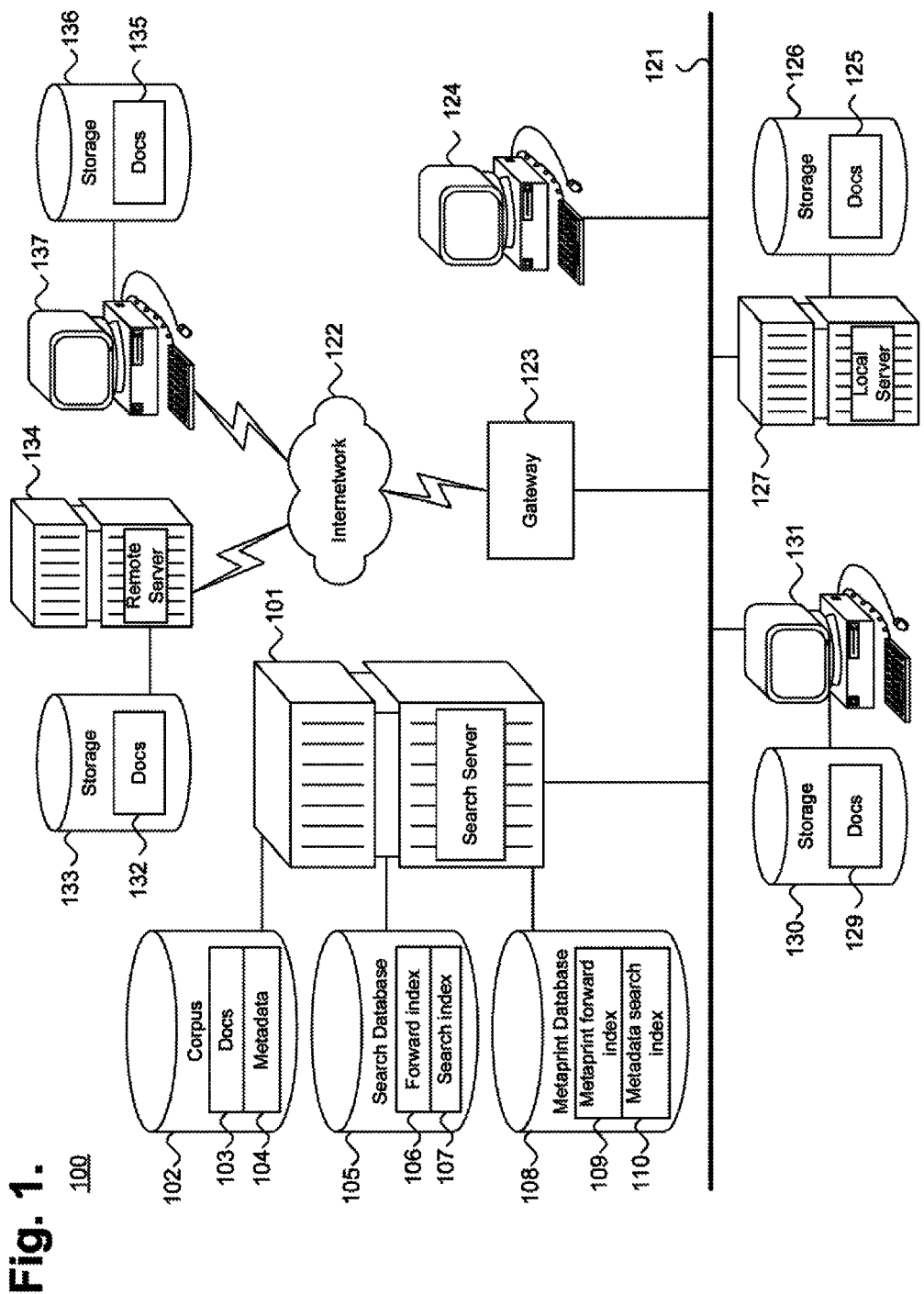
FIG. 1 is a block diagram showing a system for identifying documents matching a document metaprint, in accordance with one embodiment.

Previously-created and electronically-stored documents contain valuable knowledge and can be leveraged for increased time and cost efficiencies in preparing similar new documents. For example, a typical software licensing agreement, although specific to the particular parties involved, may have many similarities in types of clauses and language used when compared to other software license agreements. The words and word frequencies contained in a type of a document can serve as a "metaprint" of that type of document. The metaprint can then be used to identify similar documents. FIG. 1 is a block diagram showing a system 100 for identifying documents matching a document metaprint, in accordance with one embodiment. By way of illustration, the system 100 operates in a distributed computing environment, which includes a plurality of heterogeneous systems and metadata sources. Henceforth, a single source of metadata will be referenced as a "document," although metadata sources can include other forms of non-document data. Documents include all forms and types of structured and unstructured data including electronic message stores, word processing documents, electronic mail, Web pages, and graphical or multimedia data. Documents can also include subparts of larger documents, for example, chapters or paragraphs of a book or clauses or sections of contract or other legal document. Notwithstanding, the documents could be in the form of structurally organized data, such as stored in spreadsheets or databases. Although discussed in reference to documents, the system and methods disclosed herein can apply to any source of words that can be associated with one or more pieces of metadata, including username, IP address, or data repository location.

A search server 101 is coupled to a storage device 102, which stores a corpus of documents 103 and associated metadata 104 in the form of structured or unstructured data, a search database 105 for maintaining a forward index 106 and search index, or inverted index, 107 of the documents, and a metaprint database 108 for storing document metaprints, a metaprint forward index 109, and a metadata search index 110. The forward index 106 stores a list of terms, or words, for each document 103 along with the frequency and location of each word in the document, and the search index 107 stores a list of documents 103 that contain a particular word. The metaprint forward index 109 stores a list of metadata and word frequencies for each document 103. The metaprint forward index 109 is resorted and merged, using specialized machine learning techniques, to create the metadata search index 110, which stores word frequencies for each metadata keyword, stored by metadata keyword and merged across all documents.

The search server 101 is coupled to an intranetwork 121 and executes one or more software modules for automated document management, processing, indexing, and analysis, as discussed herein. The modules can be implemented as a computer program or procedure written as source code in a conventional programming language and presented for execution by a CPU as object or byte code, as is known in the art. Alternatively, the modules could also be implemented in hardware, either as integrated circuitry or burned into read-only memory components. Other types of modules and module functions are possible. The various implementations of the source code and object and byte codes can be held on a computer-readable storage medium, such as a floppy disk, hard drive, digital video disk (DVD), random access memory (RAM), read-only memory (ROM) and similar storage mediums, or embodied on a transmission medium in a carrier wave. In a further embodiment, the search server 101 can be accessed via an internetwork 122. The search server 101 can include other components, such as such as a input/output ports, network interfaces, and non-volatile storage.

A user interacts with the system through a user computer 124 that can be located locally on the intranetwork 121 or remotely through the internetwork 122. The user inputs a search query of one or more query terms through the user computer 124, which is then received on, and executed by, the search server 101, as further described below beginning with reference to FIG. 2. Search results are returned for display, or other output, on the client computer 124, including a link, such as hyperlink, to access the documents returned. Other modes of presentation are possible. In a further embodiment, documents matching only a subset of the query terms are obtained and presented to the user.

The search server 101 operates on documents 103 and metadata 104, which can be retrieved from the storage 102, as well as a plurality of local and remote sources. The local sources include documents 125 maintained in a storage device 126 coupled to a local server 127 and documents 129 maintained in a storage device 130 coupled to a local user computer 131. The local server 127 and user computers 124, 131 are interconnected to the search server 101 over the intranetwork 121. In addition, the search server 101 can identify and retrieve documents via a search application, or spiders, from remote sources over the internetwork 122, including the Internet, through a gateway 123 interfaced to the intranetwork 121. The remote sources include documents 132 maintained in a storage device 133 coupled to a remote server 134 and documents 135 maintained in a storage device 136 coupled to a remote user computer 137. Other document sources, either local or remote, are possible.

In a further embodiment, the storage 102 maintains a cached copy 103 of retrieved documents 125, 129, 132, 135. The cached copies 103, including metadata 104, in the storage 102 can retain the original formatting of the documents or have the original formatting removed and stored in a normalized form. The cache 103 can also include a pointer, such as a hyperlink or file path, to the original document and source. The storage 102 is updated periodically to reflect any changes to the documents 103, 125, 129, 132, 135, such as new documents, deleted documents, or otherwise altered documents.

Figure 2:
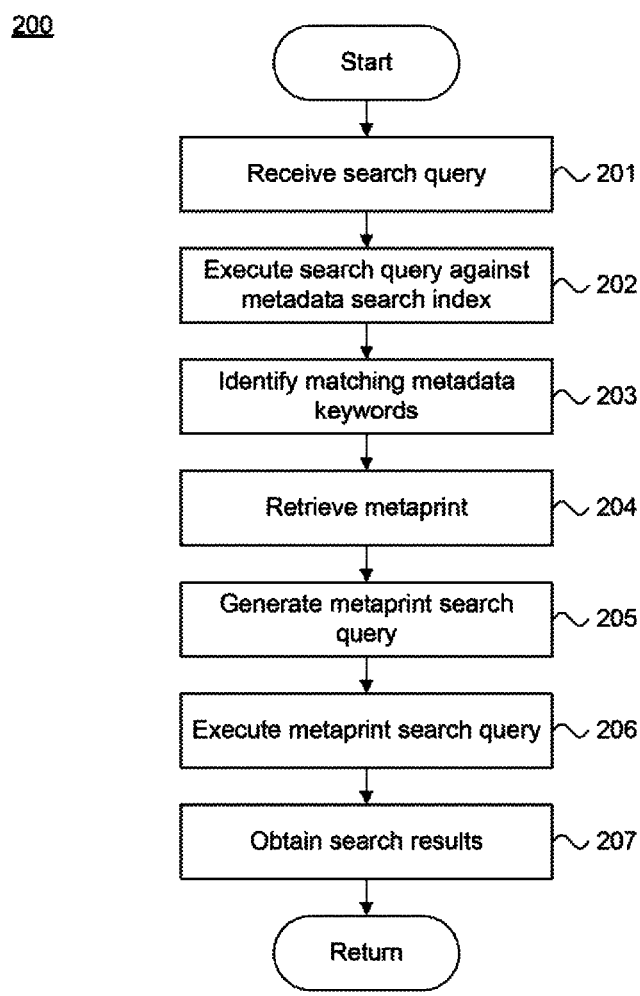
FIG. 2 is a is flow diagram showing a method for identifying documents matching a document metaprint, in accordance with one embodiment.

Document metaprints allow a user to search and identify documents of interest that may not otherwise match the user's search query. FIG. 2 is a process flow diagram showing a method 200 for identifying documents matching a document metaprint, in accordance with one embodiment. A search query comprising one or more search terms is received from a user (step 201). The search query is applied against the metadata search index 110 (step 202) and metadata keywords matching the search query terms are identified (step 203). In a further embodiment, various linguistics, such as word stemming, synonym expansion, and spelling corrections can be applied to the search query. The metadata search index 110 contains word frequencies for each metadata keyword merged across all cached documents 103 stored by metadata keyword, which is called a metaprint, as further described below with reference to FIG. 3. In a further embodiment, the word frequencies can be filtered to contain only the words with a frequency above a threshold value or to exclude common "stop" words such as "the" and "a".

The metaprint associated with each of the matched metadata keywords is retrieved (step 204) and used to generate a metaprint search query (step 205). The metaprint search query is applied to the search index (step 206) to identify documents that contain similar word frequencies, or metaprint, but may not match the metadata keywords either because the identified documents contain different metadata keywords or are not tagged with any metadata. Additionally, documents that may match a subset of a search query and that would be ranked lower in the search results can be ranked higher when using the metaprint search query. The identified documents are then returned and displayed to the user as search results (step 207). The search results can be presented as pointers, for example, a list of hyperlinks, such as universal resource locators, to the documents. The pointers can be to the cached documents in the storage 102, to the original location of the documents, or both. Users can then manually tag or rank the search results or automated ranking can be conducted by, for example, taking user click-through rates into account, which can be used to improve the machine learning used to generate the metaprints, as discussed further below with reference to FIG. 3.

In a further embodiment, a traditional search (not shown) is carried out substantially in parallel to the metaprint search. The search query is applied against the search index 117 and documents containing the search terms, or a subset of the terms, are returned to the user as search results.

In a still further embodiment, automated or user interactive controls are available to adjust what search results are obtained and displayed. Search results that match only the metadata keywords, only the metaprint query, only the search query terms, or permutations on combinations of the above possibilities can be displayed.

Figure 5:
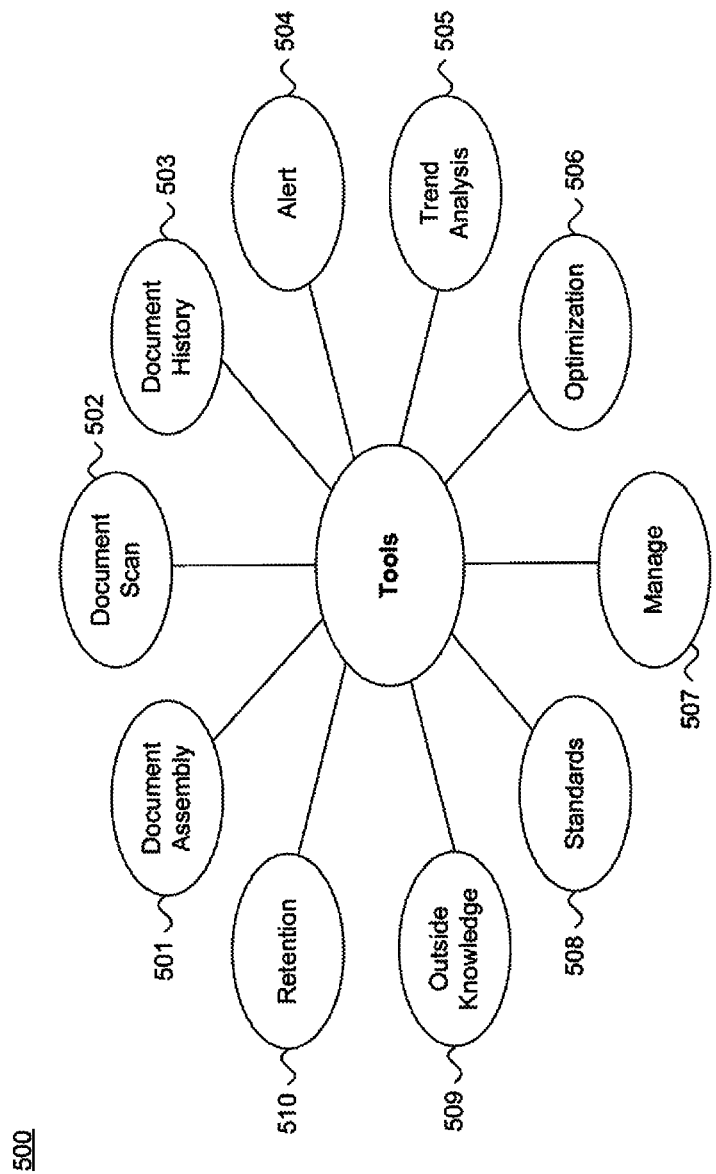
FIG. 5 is a block diagram showing tool types for metaprint queries.

In a yet further embodiment, metaprints and metaprint queries can be leveraged to aid user identification and analysis of documents, as further discussed below with reference to FIG. 5.

Figure 3:
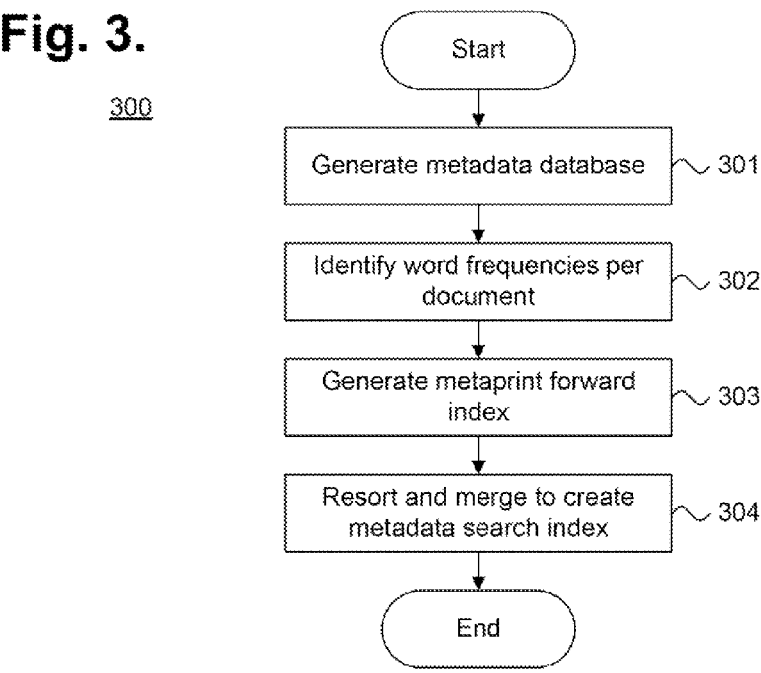
FIG. 3 is a process flow diagram showing, by way of example, a method for generating a metadata search index for use in the method of FIG. 2.

Metaprints are used identify documents of a particular type. FIG. 3 is a process flow diagram showing, by way of example, a method 300 for generating a metadata search index for use in the method of FIG. 2. A metadata database is generated (step 301) and stores a list of metadata keywords 104 for each document 103. Any security information or access controls associated with the document can also be captured and stored as part of the metadata database or search index. In a further embodiment, each metadata keyword can be associated with one or more synonyms. The synonyms can be pre-generated or added manually by a user. The frequency of words in each document is determined (step 302). The word frequencies can be generated on-demand or previously generated, such as in the forward index 109, and then accessed. The metadata and word frequencies of each document are combined on a per document basis to generate the metaprint forward index 109 (step 303) that stores a document metaprint for each metadata keyword. The metaprint forward index 109 is resorted and merged to create the metadata search index 110 (step 304) that stores word frequencies for each metadata keyword merged across all documents, stored by metadata keyword.

The metadata search index 110 is generated from the metaprint forward index 109 using machine learning techniques applied to the document corpus 102. The metaprint generated for each metadata keyword utilizes multiple document numbers and types that share one or more of the same, or synonymous, metadata keywords, resulting in a more efficient and broadly applicable approach than using only one document and that document's associated word frequency.

All or a subset of metadata keywords and their associated word frequencies can be used to generate the metadata search index 110. Some metadata keywords may have more predictive value than others in identifying documents. One or more metadata keywords can be removed, or filtered, from inclusion in the metadata search index 110 based on automated or user-input mechanisms. In some instances, for example, metadata regarding date of creation of a document may be of lower interest when looking for examples of a particular document type than metadata regarding the title of the document. Thus, the less predictive metadata can be filtered from the metadata search index 110. Other filtering methods are possible.

In a further embodiment, the word frequencies associated with the metadata keywords can be adjusted, or otherwise manipulated, prior to generating the metadata search index 110. For example, only words with a frequency above a threshold value would be included as part of the metaprint. In a further embodiment, common "stop" words such as "the" and "a" are excluded from the metaprint. Additionally, use of a simple average or weighed average of words instead of word frequencies is possible. In a further embodiment, inverse word frequencies instead of word frequencies can be used. Other word frequency adjustments are possible.

In a further embodiment, the machine learning used to generate metaprints incorporates implicit or direct user feedback to improve the machine learning. For example, implicit user feedback can include taking user click-through rates into account. Direct user feedback allows users to manually tag or rank the search results. Other types of user feedback are possible.

Figure 4:
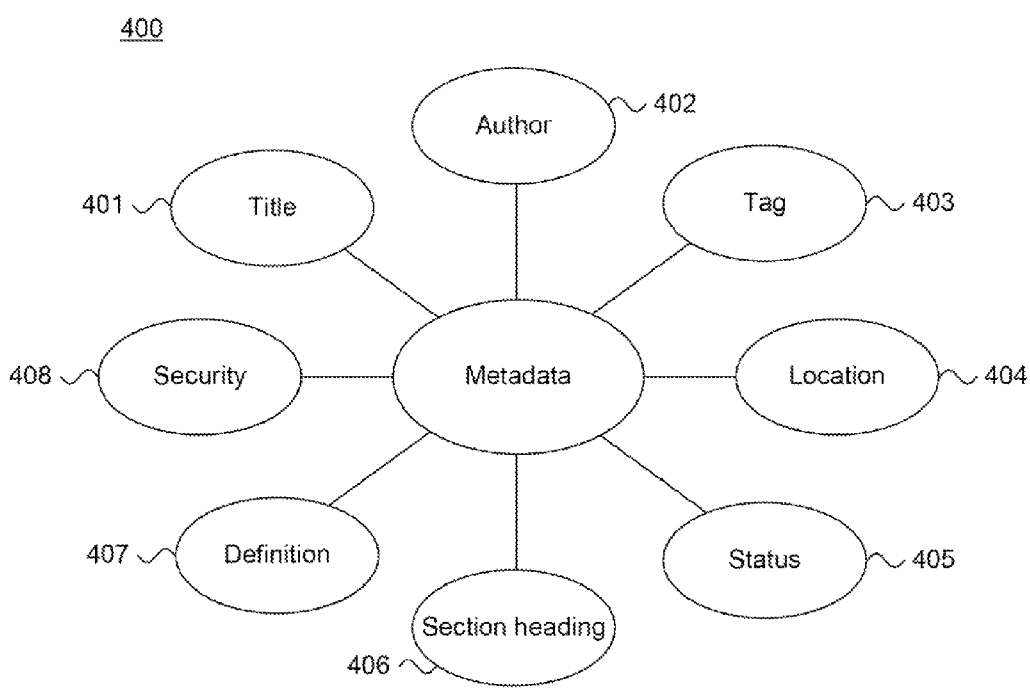
FIG. 4 is a block diagram showing, by way of example, metadata types for use in the method of FIG. 2.

Metadata associated with documents is utilized to generate metaprints of different types of documents. FIG. 4 is a block diagram showing, by way of example, metadata types 400 for use in the method of FIG. 2. Types of metadata include title metadata 401, author metadata 402, tag metadata 403, location metadata 404, status metadata 405, section heading metadata 406, definitions metadata 407, and security metadata 408. Other types of metadata are possible.

Title metadata 401 can include the file name given a document or can be identified within the content of a document. Author metadata 402 includes the creator of a document and any other individuals who have otherwise edited the document. Tag metadata 403 includes any information with which the document has been tagged. A user can manually tag an entire document or subset of the document, by, for example, highlighting a paragraph and adding one or more tags. Location metadata 404 includes the file path of the document. Location metadata 404 can also include other location information, such as IP address where the document is located. Status metadata 405 includes whether the document is a draft or a final version. Status can also include whether a document was filed in court, for example a court pleading, or the document was a signed contract.

Section heading metadata 406 and definition metadata 407 are identified in the content of the document. Section heading metadata 406, for example, can include section heading of contract provisions. Definition metadata 407 can include defined terms in an agreement. Security metadata 408 includes information regarding access control to a document. For example, if a particular user does not have access to a specific document, the specific document can be removed from the search results shown to the particular user.

Metaprints and metaprint queries can be used in a variety of ways to aid in discovery, analysis, and generation of additional information regarding documents for the user. FIG. 5 is a block diagram showing tool types 500 for metaprint queries. Types of tools include document assembly 501, document scan 502, document history 503, alert 504, trend analysis 505, optimization 506, manage 507, standards 508, outside knowledge 509, and retention 510. Other types of tools are possible.

Document assembly 501 allows a user to generate new documents from search results. A user generates search results, as discussed above with reference to FIG. 2 and then can interact with the results, for example drag and drop through the mouse, into a new document. Multiple search results from the same or different searches can be combined into the same document. The results in the new document can then be assembled, edited, or rearranged as needed. In one embodiment, the new document is automatically formatted in a preferred document format, such as a contract or other legal document. In a further embodiment, the new selected search results are initially placed in an outline format that then can be assembled into a document.

Document scan 502 scans documents to identifying portions, such as sections of a document, that are or are not preferred by the user. For example, a metaprint of a type of clause or a particular version of a clause in a contract can be selected. The selected metaprint is then used to search the document for a match. Whether a matching clause is found in the document is then displayed to the user. For example, a corporate legal department can select one or more metaprints of clauses that the department does not want to see in any contracts, such as an arbitration clause, or clauses that are wanted, such as a limitation on liability. When an inside or outside counsel is preparing to review a contract for the company, the document scan 502 identifies clauses that are historically objected to by the company or identifies clauses the company requires or prefers to have in contracts that are currently missing. Similarly, when a contract is routed for approval, the tool checks the contract for required or prohibited metaprints or variations of those metaprints.

Document history 503 analyzes a document and identifies any similar documents and any associated information about the identified documents. For example, a legal department may want to find out whether they have had a contract or legal case similar to a current contract or case in the past. Based on the current document, such as a contract or court pleading, similar past documents can be identified. Additionally, the number of similar documents, which party or parties were involved, which attorneys handled the previous matters, the costs involved, timeline for resolution of the matter, outcome, and any other relevant information can be identified from the associated metadata.

Alert 504 analyzes metaprints of a document, such as relevant contractual or other language, that has been adjudicated in a recent court decision and then searches the company's databases for the relevancy of that decision to the company's documents. For example, a contractual clause can be ruled as unenforceable in a court decision. The metaprint of the clause is used to search the document database of the company to identify any documents that contain a similar clause.

Trend analysis 505 provides a user with trend details of created documents. For example, a managing attorney can review what documents are created the most, whether the type and number of documents vary based on time of year, and which kind of documents have been created with a particular client or customer of the company.

Optimization 506 analyzes a selected process, such as negotiation and execution of a standard contract, for possible areas of improvement or optimization. For example if, during drafting and negotiation of a contract, one of the clauses is always eventually removed or otherwise edited prior to finalization, the change can be identified. Additionally, any fall back clause used instead of the original clause can be identified. In the future, drafters can start with the fall back clause to potentially speed up the negotiation process.

The manage 507 tool tracks what documents users are associated with, such as drafting, editing, or reviewing within a specified timeframe. Additionally, which user may have the most knowledge about a particular topic or client can be determined from the user metadata associated with a particular metaprint.

The standards 508 tool can be used to analyze documents across a variety of corporations or other entities and identify the documents that are the most broadly used. The most used documents can be then used to develop adoption of standard documents, such as contract clauses and terms. The more users work with standard provisions, the faster transactions can become. This offers a bottom-up approach to developing standards as actual documents used by corporations are used in their development. For example, the top two definitions of "source code" can be identified. Once determined, the definitions can be used to play a role in naming and getting standards created around the definitions.

The outside knowledge 509 tool allows a user to leverage relevant knowledge from sources outside of the user's corporate environment. For example, publishers of relevant legal knowledge, such as textbooks, law firm newsletters, and law review articles, can tag, or otherwise associate, their material with relevant metaprints which can then be accessed by users. A publisher or author can tag an article, such as on intellectual property indemnity, with one or more metaprints for intellectual property indemnity clauses. When a user searches for that type of clause in the system 100, the results from the outside resources are made available to the user in addition to the results from within the corporate environment. The results from outside sources can be displayed separately from, or integrated with, the inside results.

Retention 510 utilizes a metaprint of a document that is scheduled for deletion from the company's records pursuant to the company's document retention policy and searches for all copies of the document, or similar documents, within the corporate network. The tool then confirms that all copies have been deleted, or alternatively, identifies where copies of the document reside on the databases or local drives and notifies the user.

While the invention has been particularly shown and described as referenced to the embodiments thereof, those skilled in the art will understand that the foregoing and other changes in form and detail may be made therein without departing from the spirit and scope.

What is claimed is:

1. A system for identifying documents matching a document metaprint, comprising:
    a processor to execute modules of the system stored in a memory of a computer-readable storage medium, the modules comprising:
        a metadata index module for creating a metaprint for each document in a corpus of documents, comprising:
            an extraction module for extracting metadata keywords from the document;
            a calculator module for calculating a word frequency of occurrence of each of the metadata keywords extracted from the document;
            a word frequency module for generating a metaprint forward index for the document comprising a list of metadata of the document and the calculated word frequency of each of the metadata keywords of the document;
            a merge module for resorting and merging the metaprint forward indexes across all of the documents in the corpus into a metadata search index comprising:
                a word frequency storage module for storing the word frequency for each of the metadata keywords into the metadata search index;
                a supplement module for supplementing each metadata keyword with one or more synonyms of the metadata keyword; and
                a synonym storage module for storing the synonyms into the metadata search index keyed on the metadata keyword and generating the metaprint for the document;
        a search index module for generating a search index comprising one or more words that are not the metadata keywords extracted from those documents in the corpus;
        a metadata keyword module for receiving a search query comprising one or more search terms from a user;
        an application module for applying the search query to the metadata search index;
        an identification module for identifying one or more of the metadata keywords matching the one or more of the search terms;
        a metaprint query module for retrieving the metaprint associated with each of the matched metadata keywords and for generating a metaprint search query from the retrieved metaprints associated with each of the matched metadata keywords and the synonyms for each of the matched metadata keywords;

a metaprint query execution module for applying the metaprint search query to the search index and identifying documents that contain similar word frequencies or metaprints with the metaprint search query; and a metaprint query results module for obtaining search results comprising documents matching the metaprint search query.

2. A system according to claim 1, further comprising:
a search query execution module to execute the search query against the corpus of documents; and
a search query results module to obtain the search results comprising each of the documents in the corpus that matches at least one of the search terms.

3. A system according to claim 2, further comprising:
a display module to display only those search results matching the search terms and the metaprint.

4. A system according to claim 2, further comprising:
a display module to display only those search results matching the search terms and the metaprint query.

5. A system according to claim 1, further comprising:
a filter module to filter the search results based on a metadata type.

6. A system according to claim 1, further comprising:
a feedback module to incorporate one of direct user feedback and indirect user feedback when obtaining the search results.

7. A system according to claim 1, wherein the metadata comprise at least one of title, author, tag, location, status, section heading, definition, and security.

8. A system according to claim 1, wherein the documents comprise at least one of email, audio file, video file, and word processing document.

9. A computer-implemented method for identifying documents matching a document metaprint, comprising:
creating a metaprint for each document in a corpus of documents, comprising:
extracting metadata keywords from the document;
calculating a word frequency of occurrence of each of the metadata keywords extracted from the document;
generating a metaprint forward index for the document comprising a list of metadata of the document and the calculated word frequency of each of the metadata keywords of the document; and
resorting and merging the metaprint forward indexes across all of the documents in the corpus into a metadata search index comprising:
storing the word frequency for each of the metadata keywords into the metadata search index;
supplementing each metadata keyword with one or more synonyms of the metadata keyword; and
storing the synonyms into the metadata search index keyed on the metadata keyword and generating the metaprint for the document, generating a search index comprising one or more words that are not the metadata keywords extracted from those documents in the corpus;

receiving a search query comprising one or more search terms from a user;

applying the search query to the metadata search index;

identifying one or more of the metadata keywords matching the one or more of the search terms;

retrieving the metaprint associated with each of the matched metadata keywords;

generating a metaprint search query from the retrieved metaprint associated with each of the matched metadata keywords and the synonyms for each of the matched metadata keywords;

applying the metaprint search query to the search index and identifying documents that contain similar word frequencies or metaprints with the metaprint search query; and obtaining search results comprising documents matching the metaprint search query.

10. A computer-implemented method according to claim 9, further comprising:
executing the search query against the corpus of documents; and
obtaining the search results comprising each of the documents in the corpus that matches at least one of the search terms.

11. A computer-implemented method according to claim 10, further comprising:
displaying only those search results matching the search terms and the metaprint.

12. A computer-implemented method according to claim 10, further comprising:
displaying only those search results matching the search terms and the metaprint query.

13. A computer-implemented method according to claim 9, further comprising:
filtering the search results based on a metadata type.

14. A computer-implemented method according to claim 9, further comprising:
incorporating one of direct user feedback and indirect user feedback when obtaining the search results.

15. A computer-implemented method according to claim 9, wherein the metadata comprise at least one of title, author, tag, location, status, section heading, definition, and security.

16. A computer-implemented method according to claim 9, wherein the documents comprise at least one of email, audio file, video file, and word processing document.

* * * * *